(12) United States Patent
Young et al.

(10) Patent No.: US 7,450,022 B2
(45) Date of Patent: Nov. 11, 2008

(54) BEARING FAILURE IDENTIFICATION SYSTEM

(75) Inventors: Phillip D. Young, San Diego, CA (US); Dirk Fichtner, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 484 days.

(21) Appl. No.: 11/227,296

(22) Filed: Sep. 15, 2005

(65) Prior Publication Data

US 2007/0057583 A1 Mar. 15, 2007

(51) Int. Cl.
*G08B 21/00* (2006.01)
*G01K 1/08* (2006.01)
*H02K 11/00* (2006.01)
*G01B 3/44* (2006.01)

(52) U.S. Cl. .......... 340/648; 340/647; 340/652; 340/682; 702/34; 374/142; 310/68 C

(58) Field of Classification Search ......... 340/647–648, 340/652, 682; 702/34; 374/142; 310/68 C
See application file for complete search history.

(56) References Cited

U.S. PATENT DOCUMENTS

| 2,794,136 | A | * | 5/1957 | Kalikow et al. ........... 310/68 C |
| 3,611,036 | A | * | 10/1971 | Edson .......................... 361/47 |
| 4,074,575 | A | * | 2/1978 | Bergman et al. ............ 374/142 |
| 4,199,718 | A | * | 4/1980 | Ikeda et al. ................. 324/772 |
| 4,334,189 | A | * | 6/1982 | Sato ............................ 324/772 |
| 4,340,886 | A | * | 7/1982 | Boldt et al. ................. 340/682 |
| 4,379,291 | A | * | 4/1983 | Hubbard et al. ............. 340/682 |
| 4,539,499 | A | * | 9/1985 | Punch et al. ................. 310/214 |
| 4,584,865 | A | * | 4/1986 | Hutchins ........................ 73/7 |
| 5,140,311 | A | * | 8/1992 | Cook .......................... 340/682 |
| 5,381,090 | A | * | 1/1995 | Adler et al. ................. 324/174 |
| 6,300,701 | B1 | * | 10/2001 | Ong et al. .................... 310/179 |
| 6,445,099 | B1 | * | 9/2002 | Roseman ..................... 310/90 |
| 6,504,275 | B2 | * | 1/2003 | Nondahl et al. ........... 310/68 B |
| 7,019,611 | B2 | * | 3/2006 | Kaku et al. ................. 336/178 |

* cited by examiner

*Primary Examiner*—Benjamin C Lee
(74) *Attorney, Agent, or Firm*—Carlson, Gaskey & Olds PC

(57) ABSTRACT

A bearing failure detection system includes a thermal protector switch circuit having a wear strip located within an interior of a motor stator. In response to bearing failure or wear above a predetermined magnitude, the motor rotor will shift off its axis of rotation and wear away the wear strip or break the electrically conducting material of the wear strip and activate the stator thermal protector switch circuit and shut down the electric motor. The wear strips assist the thermal protector switch circuit in the identification of a bearing failure and the light rubbing that results therefrom prior to the generation of an electrical burning smell that may otherwise occur after a prolonged period of rubbing.

13 Claims, 5 Drawing Sheets

BEARING FAILURE IDENTIFICATION SYSTEM

BACKGROUND OF THE INVENTION

The present invention relates to a system that utilizes support bearings, and more particularly to a system that identifies bearing wear in response to a first component moving into contact with a second component.

Electric motors are utilized in numerous systems. Aircraft often utilize electric motor driven fan systems to circulate airflow within the aircraft cabin. In time, a rotor bearing may fail and the rotor shaft may be displaced from coaxial rotation about its axis of rotation. As the off-axis motor rotor continues to rotate, the motor rotor may lightly rub the interior of a motor stator. The rubbing is typically not significant enough to trip the aircraft circuit breakers or motor stator embedded thermal protector switch circuit, however, the rubbing may cause a slight burning electrical insulation smell within the aircraft cabin.

Although not a safety concern, aircraft operational requirements necessitate that the fans follow on-condition maintenance operation criteria and never cause an electrical smell in the cabin. An on-condition maintenance operation criterion denotes no periodic maintenance until an event indication signal is generated by the system.

Accordingly, it is desirable to provide an electric motor bearing failure identification system that meets an on-condition maintenance operation criterion and identifies a bearing failure prior to the generation of an electrical smell that can be identified within an aircraft cabin.

SUMMARY OF THE INVENTION

A bearing failure identification system according to the present invention includes a stator thermal protector switch circuit having a wear strip located within an interior of a motor stator. In response to bearing wear above a predetermined magnitude, the motor rotor will displace off its axis of rotation and wear away or cut the wear strip to break the wear strip electrical conduction path and activate the stator thermal protector switch circuit that shuts down the electric motor prior to generation of an electrical smell.

An outside diameter portion of the motor rotor may be knurled or otherwise textured or shaped cutter to more specifically tailor the rate of wear strip removal or severing after a bearing failure. The wear strips increase the stator thermal protector switch circuit fidelity in the identification of a bearing failure. The light rubbing that results therefrom is detected prior to the generation of an electrical burning smell that may otherwise occur after a prolonged period of rubbing.

In other embodiments, the bearing failure system may be utilized with any movable components such as, but not limited to a rotating shaft, impeller, slider, or blade member that may contact a relatively stationary component such as a duct in response to bearing wear.

The present invention therefore provides an electric motor bearing failure identification system that meets an on-condition maintenance operation criterion and identifies a bearing failure prior to the generation of an electrical smell that can be identified within an aircraft cabin.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
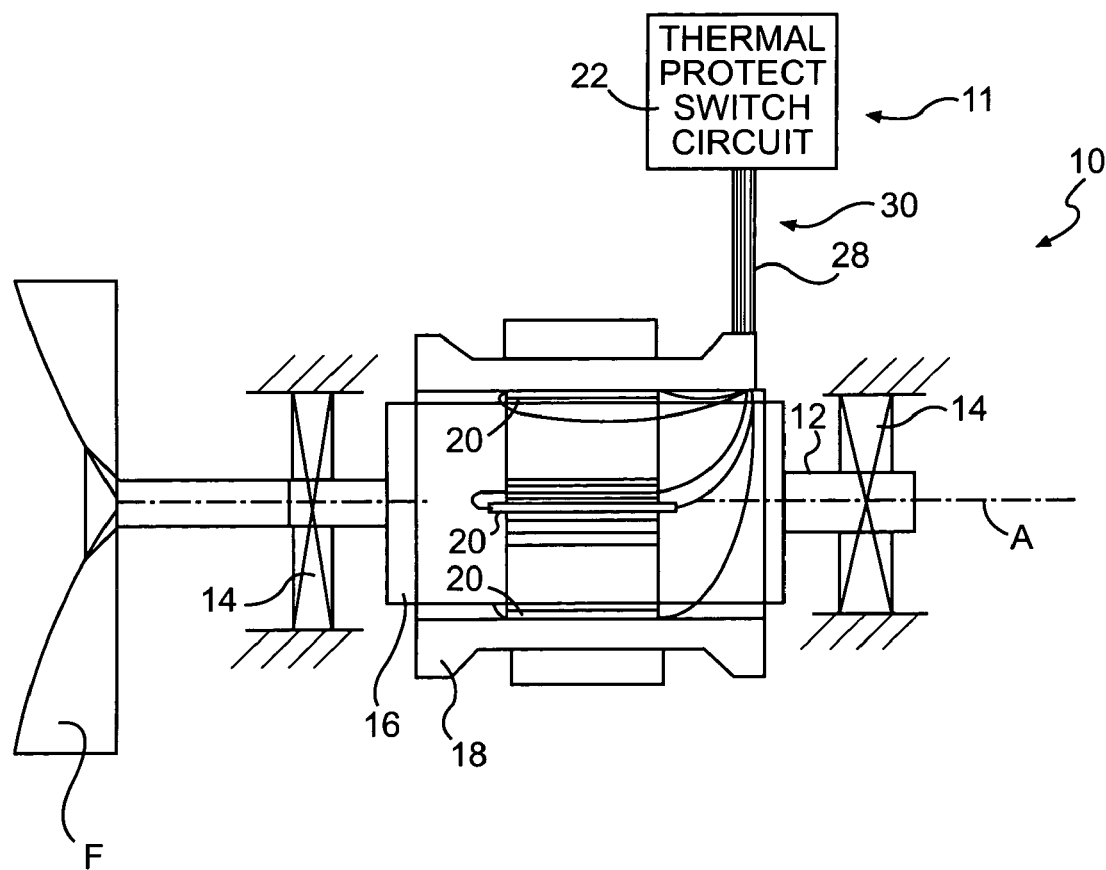
FIG. 1 is a schematic view of an electric motor for use with the present invention.

FIG. 1 illustrates a general schematic view of an electric motor 10 having a bearing failure identification system 11. The electric motor includes a shaft 12 that is supported for rotation about an axis of rotation A by a bearing 14 (two shown) to drive a component such as a fan F (illustrated schematically). The shaft 12 supports a motor rotor 16 that rotates within a motor stator 18 as generally understood. It should be understood that various electric motor driven systems will benefit from the present invention.

Figure 2:
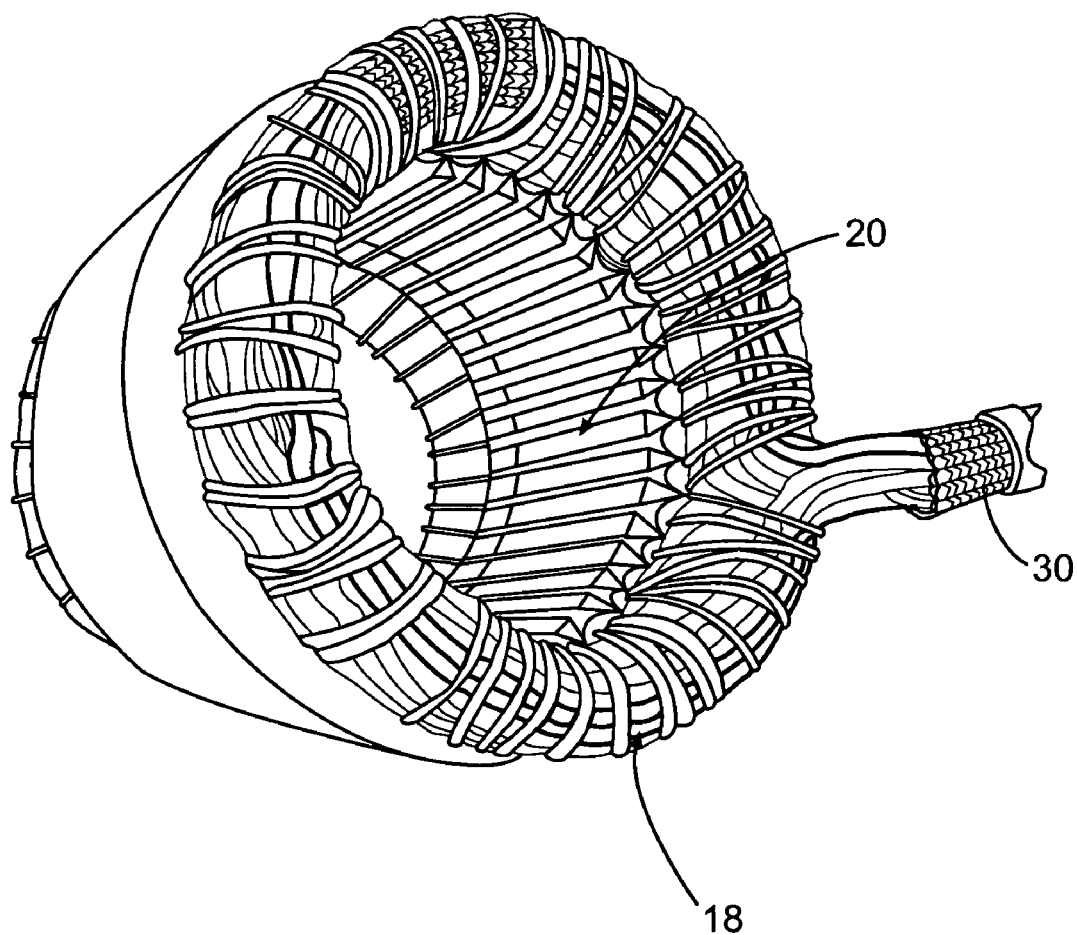
FIG. 2 is a perspective view of a motor stator with a wear strip according to the present invention mounted therein.
Figure 3:
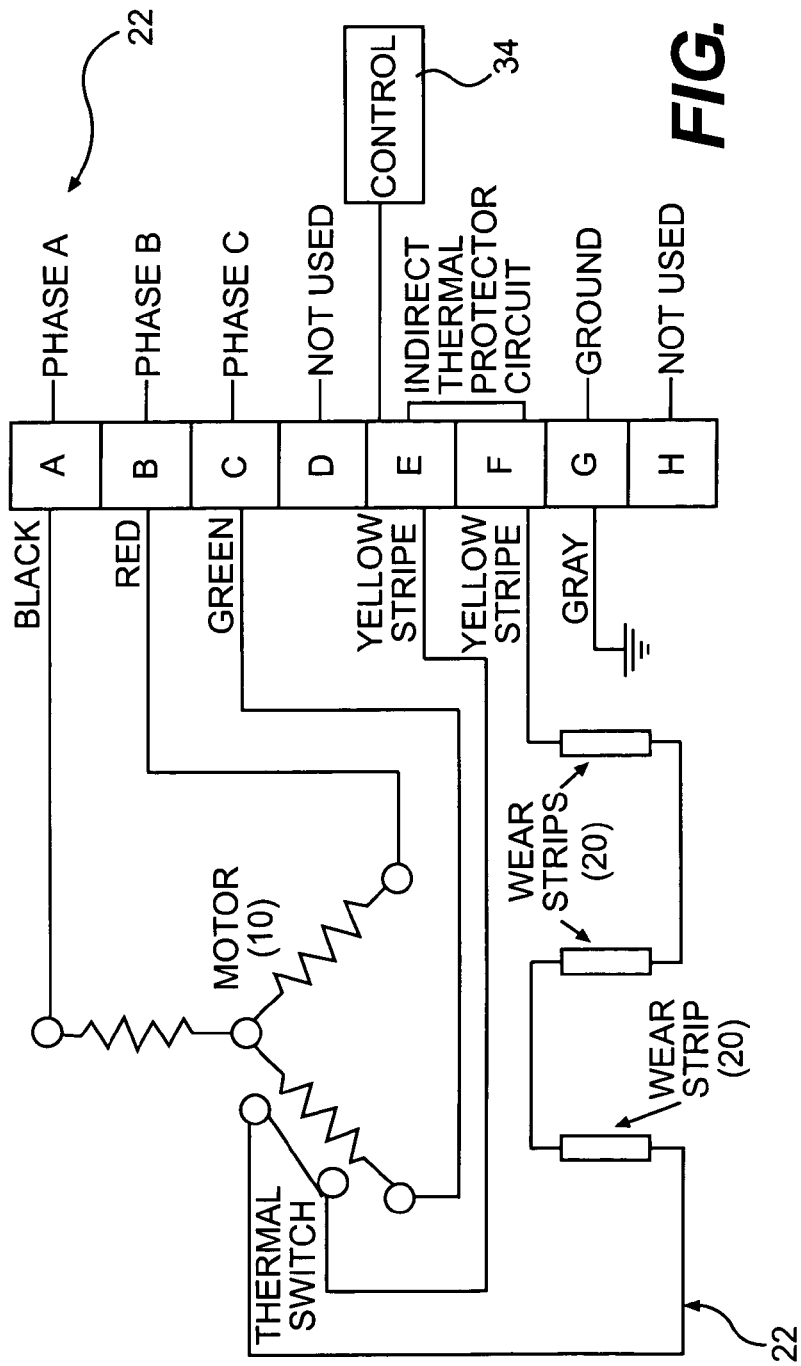
FIG. 3 is a schematic diagram of an electric circuit of an electric motor with a wear strip according to the present invention.
Figure 4:
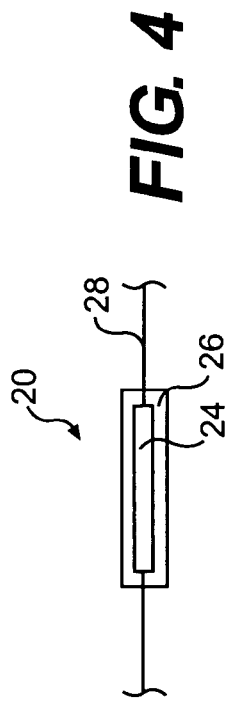
FIG. 4 is a sectional view of a wear strip.

The bearing failure identification system 11 includes a wear strip(s) 20 located within the interior of the motor stator 18 (also illustrated in FIG. 2). Electric motor rotor 16 to motor stator 18 radial clearance is typically 0.005" to 0.010" and the wear strip(s) 20 is preferably approximately 0.001 to 0.003 inch thick by 0.125 inch wide. The wear strip(s) 20 includes an electrically conducting insulated metal strip that is wired in series with a motor stator thermal protector switch circuit 22 of the bearing failure identification system 11 (also illustrated in FIGS. 3 and 4). Preferably, a multiple of wear strips 20 (three shown in FIG. 3) are mounted within the motor stator 18 so as to ensure contact between the motor rotor 16 and at least one wear strip 20.

The wear strip 20 is typically manufactured of an electrically conducting material 24 such as copper, that is surrounded by an electrically insulating material 26 (FIG. 4) such as (but not limited to) electrical motor wire insulation or ceramic material. The wear strip 20 provides significant electrical conductive properties and similar thermal expansion properties as the motor laminates to account for thermal shift during operation. The wear strips 20 may be adhesively affixed to the stator during the stator impregnation process to adhesively attach the wear strip to the motor stator 18 inner surface while minimizing the potential for inadvertent operational damage.

The stator thermal protector switch circuit 22 includes lead wires 28 that are in electrical communication with the electrically conducting material 24. The lead wires 28 are preferably passed through slots formed through the stator laminations and may be bundled with the motor lead wires/wiring harness 30 (also illustrated in FIG. 2). It should be understood that various wiring paths can be usable with the present invention. Furthermore, as typical electric motors often include a stator thermal protector switch circuit 22, the present invention is readily incorporated therewith.

In response to bearing 14 failure or wear above a predetermined magnitude, the motor rotor 16 will shift off its axis of rotation A and rub the interior of the motor stator 18. The motor rotor 16 will wear away the electrically isolating material 26 and break the electrically conducting material 24 to open the stator thermal protector switch circuit 22 that will shut down the electric motor 10. That is, the motor rotor 16 will drop or shift after a bearing failure such that the motor rotor 16 will rub the motor stator bore with wear strips 20. The motor rotor dropping causes locally wearing away or cutting of the motor stator wear strip 20 breaking the electrical conduction path. The wear strip 20 provides an electrical conduction path until bearing failure causes the motor rotor 16 to rub or cut the wear strip 29. Electrical power is then removed from the motor 10 once the rotor wearing or cutting of the wear strip 20 severs the electrical conduction path otherwise provided by the wear strip 20.

It should be understood that there are may different methods to detected the sensing circuit either an over temperature condition or a bearing failure and remove input power from the fan. It should also be understood that power can be removed from the motor 10 in various ways depending on the configuration of the power supply and thermal protection circuit such as "direct acting" or "indirect acting" thermal protection circuits. Preferably, the stator thermal protector switch circuit 22 and the bearing failure wear strip sensing circuit operate at approximately 28 VDC with a maximum current draw of 100 milliamps. A key point is that the two circuits (failure sensing and input power) are preferably separate. That is, the stator thermal protector switch circuit 22 is preferably separate from the fan input power circuit. Typically aircraft fans operate at 115 VAC input power drawing 5 to 40 amps.

Figure 5:
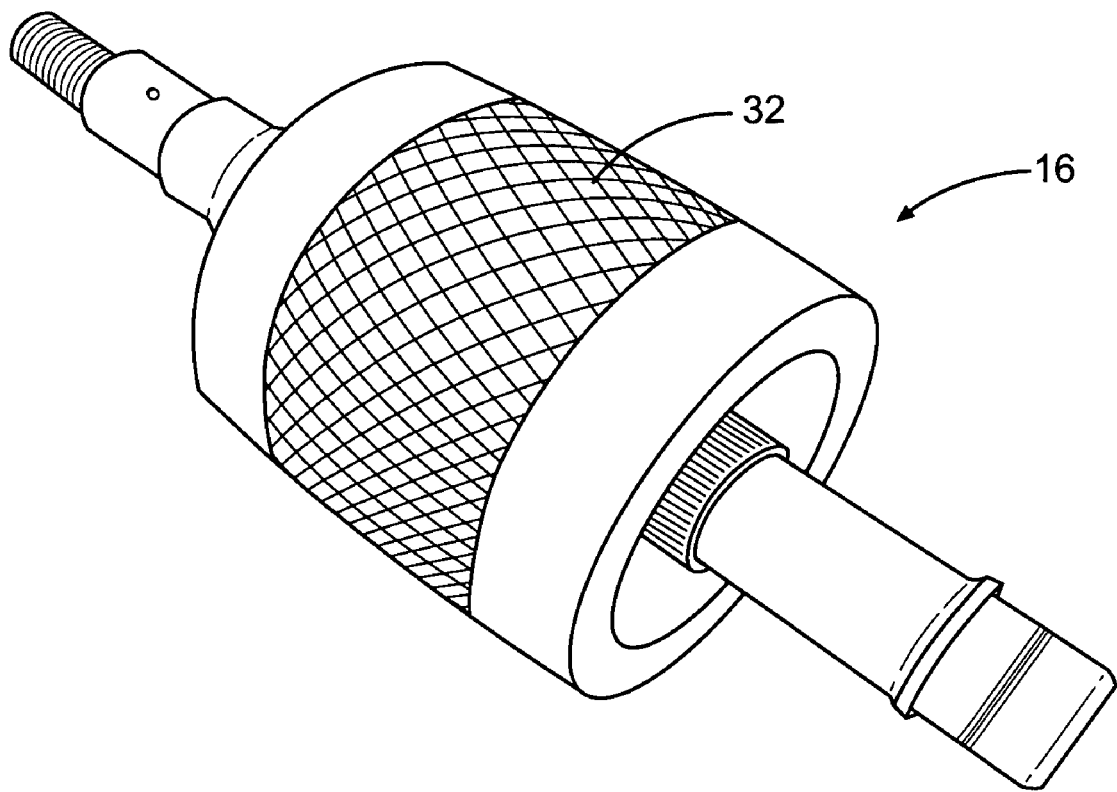
FIG. 5 is a perspective view of a motor rotor with a knurled section according to the present invention.

An outside diameter portion 32 of the motor rotor 16 (FIG. 5) may be knurled or otherwise textured or shaped to more specifically tailor the rate of wear strip 20 removal or severing after a bearing failure. That is, a more aggressively textured outside diameter portion 32 of the motor rotor 16 may be utilized to more rapidly locally wear away or sever the wear strip 20 and shut down the electric motor 10 along a predetermined accelerated time line that magnifies the rubbing effect of the motor rotor 16.

Preferably, the wear strip 20 is readily replaceable by attaching a new wear strip 20 to the lead wires 28 of the stator thermal protector switch circuit 22 after a bearing failure event. Such replacement both prevents unauthorized resetting after a failure event, yet permits reuse of the motor stator 18 after bearing replacement or motor repair.

The stator thermal protector switch circuit 22 may communicate with a higher level controller 34 (FIG. 3) to provide an indicator of motor shut down. The wear strips 20 thereby increase the fidelity of the stator thermal protector switch circuit 22 in the identification of a bearing failure and the light rubbing that results therefrom prior to the generation of an electrical burning smell may otherwise occur through prolonged rubbing.

Figure 6:
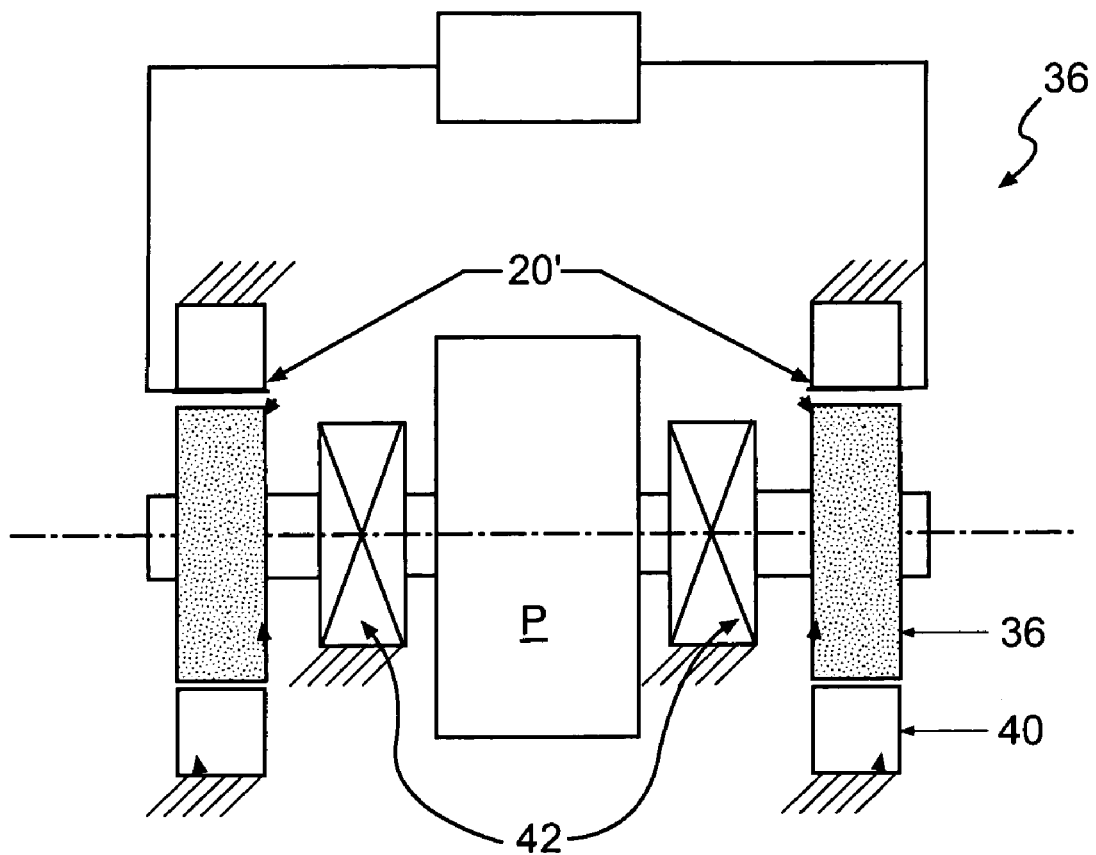
FIG. 6 is a schematic view of a generic rotating system for use with the present invention.

Referring to FIG. 6, a movable system 36 with a first component 38 that moves relative to a second component 40 on a bearing system 42 will also benefit from the present invention. That is, any dynamic component such as, but no limited to, a shaft, a blade, or an impeller that may contact a relatively stationary component such as a duct or support structure in response to bearing wear or failure is readily detected with the present invention. It should be understood that relative component motion, for that this device is effective, may include motion other than rotational motion such as linear sliding motion that may result in contact with a wear strip 20'. The wear strip 20' in the FIG. 6 embodiment is located on the relatively stationary second component 40 adjacent to the first component 38 that is illustrated herein as a collar mounted to a shaft such as a turbine shaft. Notably, the primary component P, such as a turbine wheel may be displaced from the wear strip 20' location.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A protector switch circuit system adjacent a movable component mounted to a bearing comprising:
   at least one wear strip including an electrically conducting material at least partially surrounded by an electrically isolating material, wherein contact between a movable component and said wear strip causes wear of said wear strip which actuates an electrical circuit to identify bearing wear above a predetermined magnitude wherein said wear strip is located in series with one phase of an electric motor.

2. The protector switch circuit as recited in claim 1, wherein said wear strip is located within an inner diameter of a stator.

3. The protector switch circuit as recited in claim 1, wherein said at least one wear strip includes a multiple of wear strips in series.

4. The protector switch circuit as recited in claim 1, wherein said movable component includes a motor rotor that rotates about an axis of rotation.

5. A protector switch circuit system adjacent a movable component mounted to a bearing comprising:
   at least one wear strip including an electrically conducting material at least partially surrounded by an electrically isolating material, wherein contact between a movable component and said wear strip causes wear of said wear strip which actuates an electrical circuit to identify bearing wear above a predetermined magnitude wherein said wear strip is located in series with a thermal switch.

6. A protector switch circuit system adjacent a movable component mounted to a bearing comprising:
   at least one wear strip including an electrically conducting material at least partially surrounded by an electrically isolating material, wherein contact between a movable component and said wear strip causes wear of said wear strip which actuates an electrical circuit to identify bearing wear above a predetermined magnitude wherein said movable component includes a knurled collar or shaped cutter mounted to a shaft.

7. An electric motor system comprising:
   a motor stator;
   a bearing system;

a motor rotor mounted to said bearing system for rotation relative to said motor stator about an axis of rotation that provides a clearance between said motor stator and said motor rotor; and a wear strip mounted to one of said motor stator and said motor rotor, the other of said motor stator and said motor rotor movable into contact with said wear strip in response to displacement of said motor rotor off the axis of rotation;

wherein said wear strip includes an electrical conducting material surrounded by an electrically isolating material, contact with said motor rotor operable to wear through said electrically conducting material and said electrically isolating material to activate a circuit;

wherein said electrically conducting material is in series with a stator thermal protector switch circuit.

8. The electric motor system as recited in claim 7, wherein said electrically conducting material is potted with said motor stator.

9. The electric motor system as recited in claim 7, wherein said motor rotor drives a fan.

10. An electric motor system comprising:
a motor stator;
a bearing system;
a motor rotor mounted to said bearing system for rotation relative to said motor stator about an axis of rotation that provides a clearance between said motor stator and said motor rotor; and
a wear strip mounted to one of said motor stator or said motor rotor, said other of said motor stator or said motor rotor movable into contact with said wear strip in response to displacement of said motor rotor off the axis of rotation wherein said motor rotor includes a knurled surface that facilitates wear of said wear strip which severs the electrical conduction path.

11. A method of identifying a bearing failure comprising the steps of:
(1) supporting a first component of an electric motor on a bearing system relative to a second component of the electric motor that is relatively stationary to said first component;
(2) locating a wear strip on one of the first or second components in series with one phase of the electric motor; and
(3) detecting contact between the other of the first or second components with the wear strip in response to wear of the bearing system above a predetermined magnitude.

12. A method as recited in claim 11, wherein the wear of the bearing system above a predetermined magnitude of said step (3) includes displacement of one of the first and second components off an axis of rotation that provides a clearance between the first component and the second component.

13. An electric motor system comprising:
a motor stator;
a bearing system;
a motor rotor mounted to said bearing system for rotation relative to said motor stator about an axis of rotation that provides a clearance between said motor stator and said motor rotor; and
a wear strip mounted to one of said motor stator or said motor rotor, said other of said motor stator or said motor rotor movable into contact with said wear strip in response to displacement of said motor rotor off the axis of rotation wherein said motor rotor includes a shaped cutter that facilitates wear of said wear strip which severs the electrical conduction path.

* * * * *